(12) United States Patent
Zhang et al.

(10) Patent No.: US 7,062,665 B2
(45) Date of Patent: Jun. 13, 2006

(54) CONTROL OF VOLTAGE REGULATOR THERMAL CONDITION

(75) Inventors: Michael T. Zhang, Portland, OR (US);
Benson D. Inkley, North Plains, OR (US); Peter T. Li, Portland, OR (US);
Hung-Piao Ma, Portland, OR (US);
James S. Dinh, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 10/323,563

(22) Filed: Dec. 18, 2002

(65) Prior Publication Data

US 2004/0123171 A1 Jun. 24, 2004

(51) Int. Cl.
*G05F 1/30* (2006.01)

(52) U.S. Cl. .................. 713/322; 713/300; 713/340

(58) Field of Classification Search ................ 713/300, 713/322, 340
See application file for complete search history.

(56) References Cited

U.S. PATENT DOCUMENTS

| | | | | |
|---|---|---|---|---|
| 4,675,770 A * | 6/1987 | Johansson | ..................... | 361/18 |
| 5,490,059 A * | 2/1996 | Mahalingaiah et al. | ....... | 700/46 |
| 5,640,059 A * | 6/1997 | Kammiller et al. | ........... | 307/66 |
| 5,713,030 A * | 1/1998 | Evoy | .......................... | 713/322 |
| 5,847,554 A * | 12/1998 | Wilcox et al. | .............. | 323/282 |
| 6,329,801 B1 * | 12/2001 | Zuniga et al. | .............. | 323/285 |
| 6,363,490 B1 * | 3/2002 | Senyk | ......................... | 713/300 |
| 6,472,848 B1 * | 10/2002 | Stryker et al. | .............. | 320/135 |
| 6,535,798 B1 * | 3/2003 | Bhatia et al. | ............... | 700/293 |
| 6,714,891 B1 * | 3/2004 | Dendinger | ................... | 702/132 |
| 6,791,063 B1 * | 9/2004 | Manthe | ................. | 219/130.21 |
| 6,826,702 B1 * | 11/2004 | Shibuya | ...................... | 713/320 |
| 2002/0171398 A1 * | 11/2002 | Odaohhara | .................. | 320/128 |
| 2004/0070371 A1 * | 4/2004 | Chern et al. | ................. | 320/136 |

* cited by examiner

*Primary Examiner*—Thomas Lee
*Assistant Examiner*—Vincent Tran
(74) *Attorney, Agent, or Firm*—Carrie A. Boone, P.C.

(57) ABSTRACT

A system and method for automatically adjusting microprocessor activity following thermal stress of a voltage regulator is disclosed. A thermal monitoring circuit determines whether the voltage regulator has exceeded a predetermined temperature. The thermal monitoring circuit may employ a temperature-sensing component such as a thermistor to determine the temperature or may derive the temperature indirectly, based on the average input (or output) current. When the over-temperature condition occurs, a signal activates the PROCHOT#, or similar, pin on a microprocessor, throttling the microprocessor clock. Where the microprocessor includes no internal power-reducing feature, the signal throttles an external clock coupled to the microprocessor. In either case, execution of the microprocessor is slowed down. At all times, the voltage regulator maintains the ability to supply continuous current to the microprocessor.

18 Claims, 8 Drawing Sheets

CONTROL OF VOLTAGE REGULATOR THERMAL CONDITION

FIELD OF THE INVENTION

This invention relates to voltage regulators and, more particularly, to controlling the thermal condition of voltage regulators in processor-based systems.

BACKGROUND OF THE INVENTION

A voltage regulator is a circuit that ensures that the voltage requirement of a load is maintained. Often coupled directly to a microprocessor, the voltage regulator ensures that a constant voltage is available to the microprocessor, adjusting for variations in both the power consumption by the microprocessor and the input voltage. The voltage regulator may also perform voltage conversion, such as converting a 12V source voltage to a microprocessor operating voltage of 1.35V.

As microprocessor operating frequencies increase and the operating voltages decrease, the current drawn from the voltage regulator also increases. Due to imperfect power conversion, the temperature of the voltage regulator components may exceed their rated specifications. Typically, the thermal design of the system accounts for some of the heat generated by the voltage regulator, using heat sinks and fans, for example. However, overheating of the voltage regulator may still be a problem, which can shorten the product lifetime or cause premature failure.

To reduce the high cost of cooling, some designs scale back the current delivery capacity of the voltage regulator. This is justified since typical applications draw less current than the theoretical maximum available current. However, where an application draws more current, the application may not work. In any case, the voltage regulator is likely to be overstressed, become overheated, and possibly fail. Thus, scaling back the amount of current delivered by the voltage regulator is inherently risky.

Thus, a need exists for a voltage regulator that overcomes the shortcomings of the prior art.

DETAILED DESCRIPTION

In accordance with the embodiments described herein, a system automatically adjusts microprocessor activity when the thermal stress of a voltage regulator is identified. A thermal monitoring circuit examines a location on the voltage regulator to determine whether the voltage regulator has exceeded a predetermined temperature, also known as an over-temperature condition. Alternatively, the thermal monitoring circuit detects the over-temperature condition of the voltage regulator indirectly, such as by measuring its average output (or input) current. When the over-temperature condition is identified, a signal activates the PROCHOT#, or similar, pin on a microprocessor, which, among other actions, throttles, or slows down, the microprocessor clock. Alternatively, an external clock coupled to the microprocessor is throttled to slow down the microprocessor. In either case, when the microprocessor is slowed down, its current (or power) demand is reduced, relieving the demand on the voltage regulator. Thus, the voltage regulator is protected from thermal extremes, yet remains able to supply continuous current to the microprocessor.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Direct Measurement of Voltage Regulator Thermal Condition

Figure 1A:
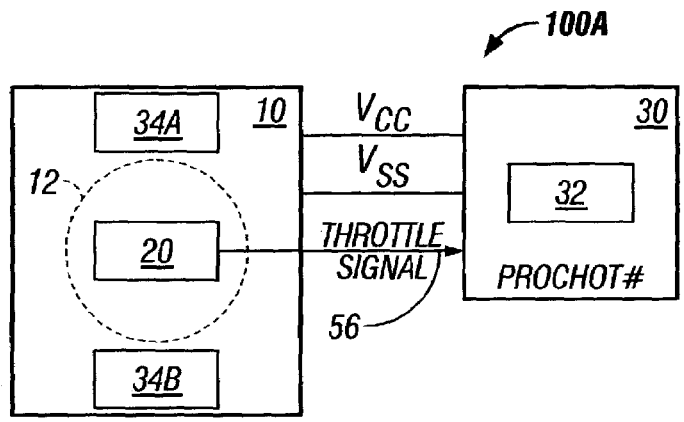
FIG. 1A is a block diagram of a system including a microprocessor with power reduction capability according to some embodiments of the invention.

In FIG. 1A, a system 100A includes a voltage regulator 10 and a microprocessor 30. The system 100A may be part of a variety of processor-based circuitry, such as a personal computer, for example. The voltage regulator 10 and the microprocessor 30 are both connected to power ($V_{cc}$) and ground ($V_{SS}$).

The voltage regulator 10 supplies current to the microprocessor 30, usually at a predetermined constant voltage. The voltage regulator generally includes resistors, capacitors, inductors, and multiple field-effect transistors (FETs) 34, for switching operations. FETs 34A and 34B (collectively, FETs 34) are depicted in FIG. 1A. FETs are typically responsible for much of the heat generated by the voltage regulator. The microprocessor 30 includes an internal clock 32, which controls, or "clocks" the rate at which instructions are executed by the microprocessor 30.

The voltage regulator 10 includes a location 12, a region at which the temperature of the voltage regulator is to be monitored. Preferably, the location 12 is situated at a place in the voltage regulator that is the most likely to get hot first, known as a "hot spot." In one embodiment, the location 12 is positioned between the two field-effect transistors (FETs) 34A and 34B. The location 12 can be identified empirically, such as by producing a thermal image of the voltage regulator circuitry during operation and designating the location 12 in a region of highest thermal activity.

A thermal monitor circuit 20 is shown as part of the voltage regulator 10, at the location 12. Alternatively, the thermal monitor circuit 20 may be outside of but coupled to the location 12. Circuitry within the thermal monitor circuit 20 produces a throttle signal 56 when the voltage regulator 10 has exceeded a predetermined temperature for a chosen duration of time. The predetermined temperature is a temperature above which operation of the voltage regulator 10 is undesirable. The chosen duration of time is a minimum time period in which the predetermined temperature is maintained. In some embodiments, the throttle signal 56 is not produced as a result of spurious temperature conditions, but only after the voltage regulator 10 has maintained the predetermined temperature for at least the chosen time duration.

Some microprocessors have thermal monitoring features for regulating heat. For example, the microprocessor may include an internal thermal sensor that monitors the junction temperature of transistors within the microprocessor. When the junction temperature exceeds a predetermined value, the internal clock 32 is automatically throttled, or slowed down. (Other actions may be taken within the microprocessor as well, such as reducing its operating voltage.) Thus, the microprocessor slows down in response to its own internal thermal condition. In some cases, the clock 32 slows down to half its normal operating rate, for a substantial reduction in microprocessor activity. The throttling of the microprocessor clock is one way to reduce the current (or power) demand of the microprocessor.

Figure 1B:
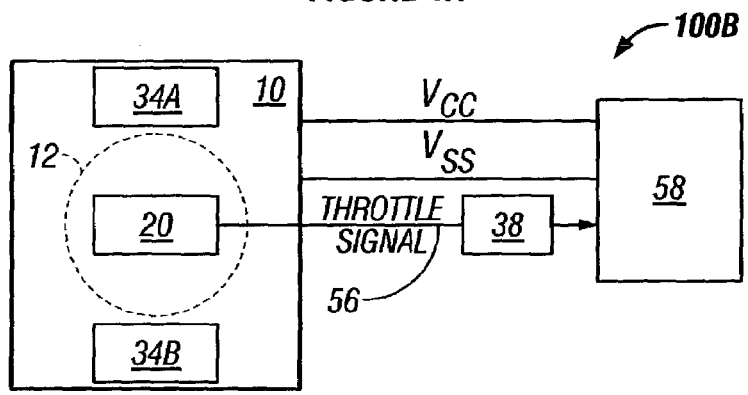
FIG. 1B is a block diagram of a system including a microprocessor with no power reduction capability according to some embodiments of the invention.

The internal thermal throttling feature of the microprocessor may also be enabled externally, by activating a PROCHOT# or similar pin on the microprocessor. The microprocessor 30 of FIG. 1A is one such processor. In the system 100A, the throttle signal 56 coming from the thermal monitor circuit 20 is connected to a PROCHOT#, or similar, pin of the microprocessor 30. When PROCHOT# is activated, the microprocessor clock is throttled. Additionally, the operating voltage may be reduced and other power-reducing operations may take place. By slowing down the microprocessor 30, the current drawn from the voltage regulator 10 by the microprocessor 30 drops, in some cases, by a substantial amount. This drop in load current helps maintain a safe operating temperature for the voltage regulator 10.

Where the microprocessor includes no PROCHOT# or similar pin and thus no way to throttle its internal clock 32, the throttle signal 56 can be sent to an external clock. In FIG. 1B, for example, a system 100B also features the voltage regulator 10, including thermal monitoring circuit 20, a microprocessor 58 and a clock 38, which is external to the microprocessor 58. The microprocessor 58 includes no internal throttling mechanism. Instead, the external clock 38 controls the rate of execution of instructions within the microprocessor 58.

In the system 100B, the throttle signal 56 is coupled to the external clock 38. When the thermal monitor circuit 20 detects a thermal condition within the region 12, the external clock 38 is throttled, causing the microprocessor 58 to execute more slowly. Accordingly, a drop in the current drawn by the microprocessor 56 is expected. When the external clock 38 is slowed down, any common clock to other parts of the system, such as a chipset clock, is also throttled, to avoid a clock synchronization problem. Thus, despite the lack of internal throttling capability, the thermal monitor circuit 20 is able to perform power reduction in the system 100B.

Figure 2:
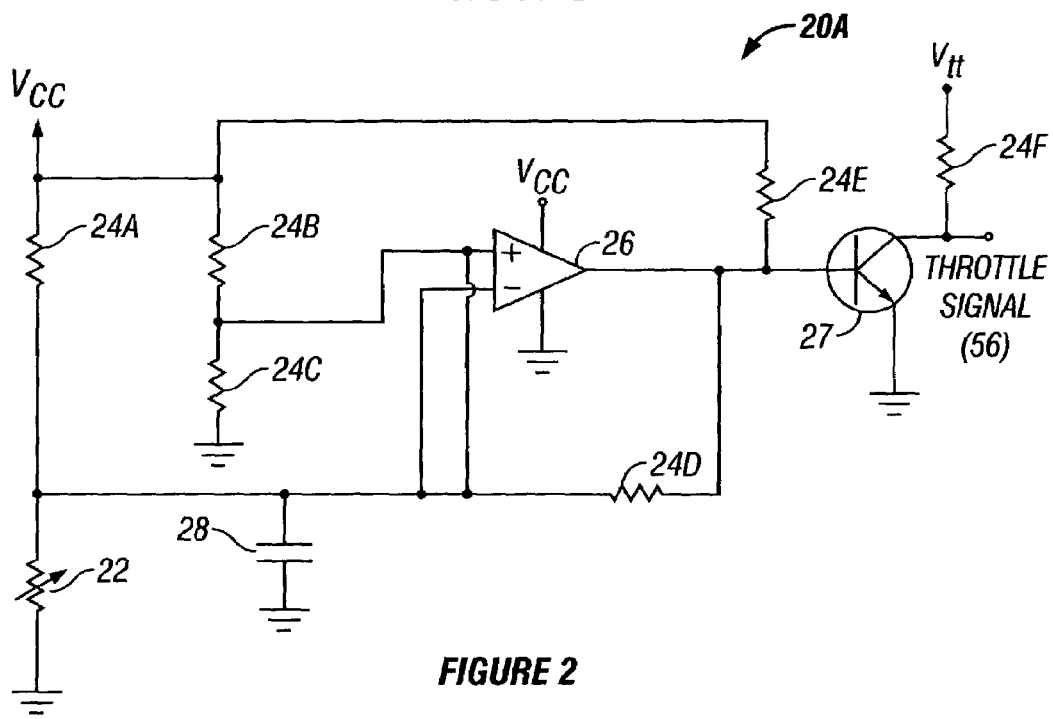
FIG. 2 is a block diagram of a first thermal monitor circuit used by the systems of FIGS. 1A and 1B according to some embodiments of the invention.
Figure 3:
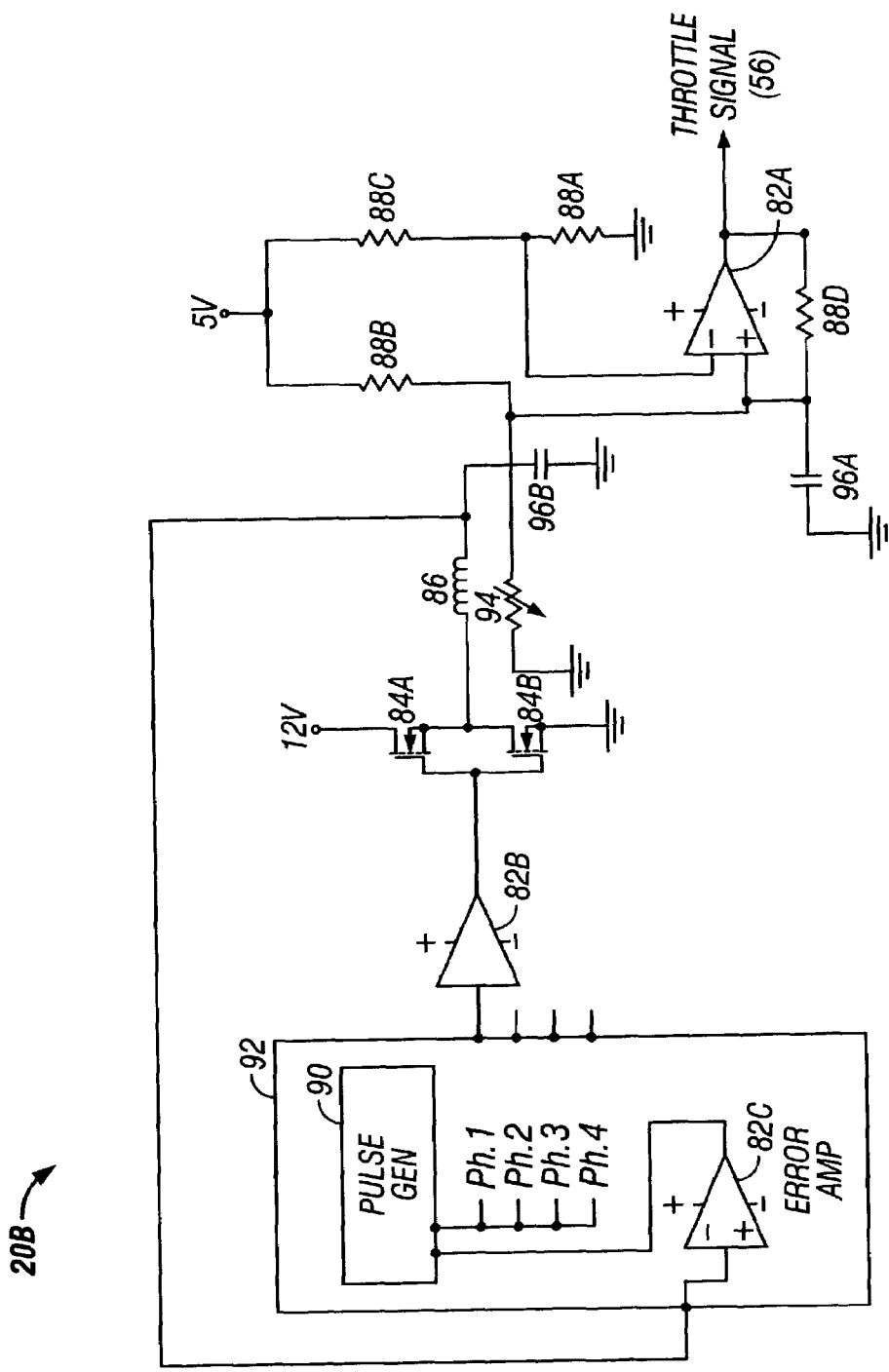
FIG. 3 is a block diagram of a third thermal monitor circuit used by the systems of FIGS. 1A and 1B according to some embodiments of the invention.
Figure 4:
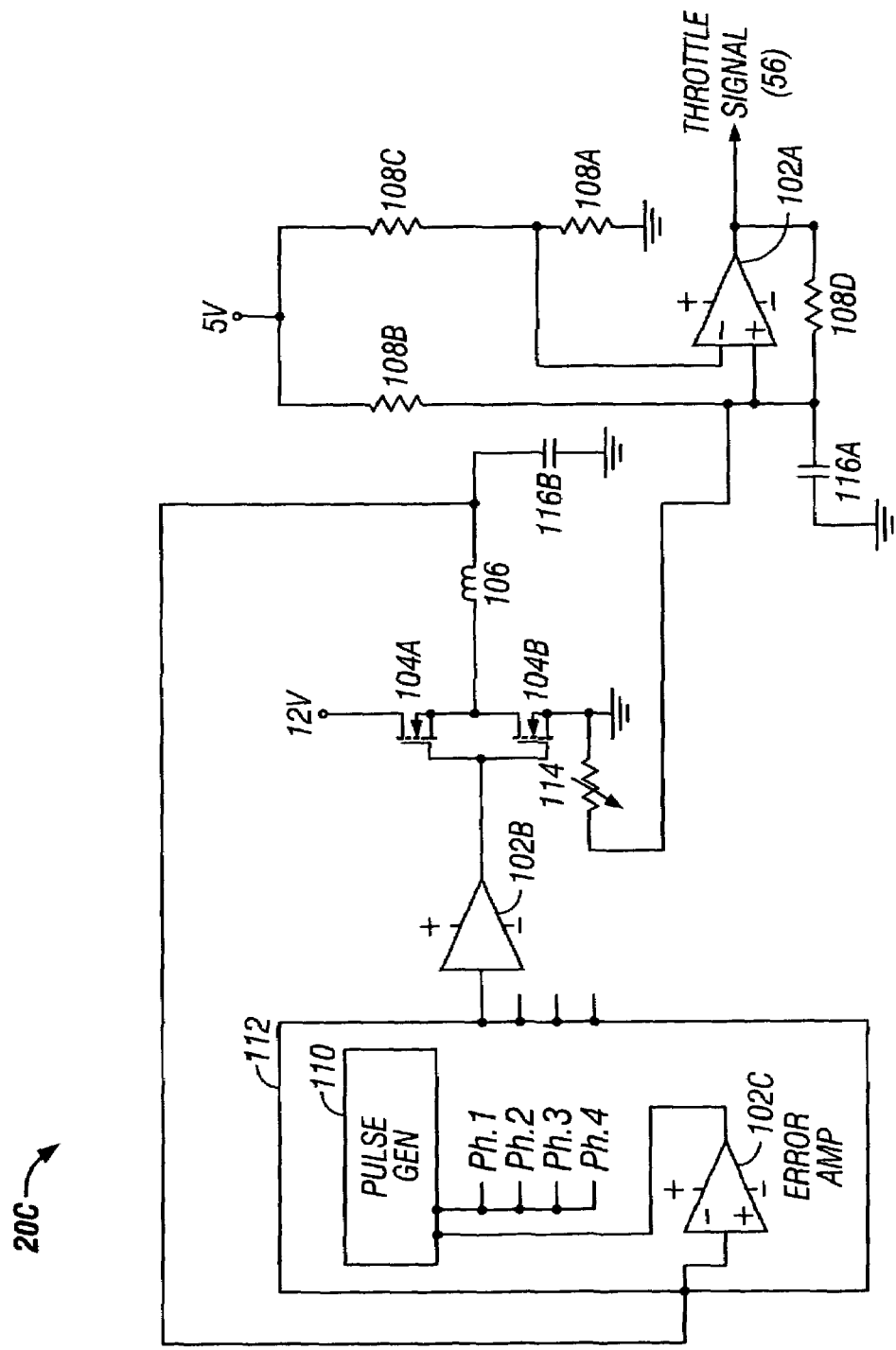
FIG. 4 is a block diagram of a fourth thermal monitor circuit used by the systems of FIGS. 1A and 1B according to some embodiments of the invention.

Three thermal monitor circuits 20A, 20B, and 20C (collectively, thermal monitor circuits 20), are depicted in FIGS. 2, 3, and 4, respectively. The thermal monitoring circuits 20 can be part of the system 100A, in which the microprocessor 30 includes internal power reduction capability, or as part of the system 100B, in which the microprocessor 58 includes no power reduction feature. Each thermal monitor circuit 20 employs a thermistor or other temperature-sensitive component to check the voltage regulator's thermal condition. A thermistor is a thermally sensitive resistor that exhibits a change in electrical resistance corresponding to a temperature change.

A first thermal monitor circuit 20A is illustrated in FIG. 2, for regulating the thermal condition of the voltage regulator 10 in the systems 100A or 100B. The thermal monitor circuit includes a thermistor 22, six resistors 24A–24F, a capacitor 28, a comparator 26, and a transistor 27. A reference voltage, established by resistors 24B and 24C, is fed into the positive input of the comparator 26.

A voltage, established by the resistor 24A and the thermistor 22, is fed into a negative feed of the comparator 26. The throttle signal 56 is issued from the transistor 27 when the resistance of the thermistor 22 drops below a predetermined resistance, due to an increase in temperature of the location 12 for a chosen duration of time.

A second thermal monitor circuit 20B is depicted in FIG. 3, also for regulating the thermal condition of the voltage regulator 10 in the systems 100A or 100B. The thermal monitoring circuit 20B includes a pulse width modulator (PWM) 92, including a pulse generator 90, op amps 82A–82C, field-effect transistors (FETs) 84A and 84B, capacitors 96A and 96B, resistors 88A–88D, an inductor 86, and an thermistor 94. The thermal monitor circuit 20B operates in a single phase of the voltage regulator, as the other phases' outputs can be derived from the single phase. Alternatively, each phase can be monitored separately, although redundant monitoring circuitry is expected to increase the cost of the thermal monitor circuit.

As shown in FIG. 3, the thermistor 94 is substantially near the inductor 86. As the output current increases, the temperature of the inductor will increase as well. Alternatively, the thermistor 94 could be positioned close to one of the FETs 84A or 84B, the op amp 82B, or other designated "hot spots" not included in the schematic, such as near an input filter.

As the temperature rises above a predetermined value, the resistance of the thermistor 94 decreases. When the resistance drops lower than the resistor 88A, the output of the op amp 82A will go low. Then, when the temperature is reduced by about 0.1% (where hysteresis is provided by the resistor 88D), the output of the op amp 82A will again go high. The predetermined temperature is arbitrary, and may be changed by modifying the value of the resistor 88A.

FIG. 4 depicts a third thermal monitor circuit 20C, also for regulating the thermal condition of the voltage regulator 10 in the systems 100A or 100B. The thermal monitoring circuit 20C includes a pulse width modulator (PWM) 112, including a pulse generator 110, op amps 102A–102C, field-effect transistors (FETs) 104A and 104B, capacitors 116A and 116B, resistors 108A–108D, an inductor 106, and a thermistor 114.

Operation of the thermal monitor circuit 20C is similar to the thermal monitor circuit 20B, except that the temperature of the thermistor 114 will track the current through the FET 104B rather than through the inductor 106. Again, the thermistor can alternatively be placed near other designated "hot spots" of the circuitry. Since the direct current (DC) resistance of the inductor 106 varies about five percent and the $R_{DS-ON}$ of the FET 104B varies by about ten percent, the thermal monitor circuit 20B is preferred over the thermal monitor circuit 20C, in one embodiment.

Figure 5:
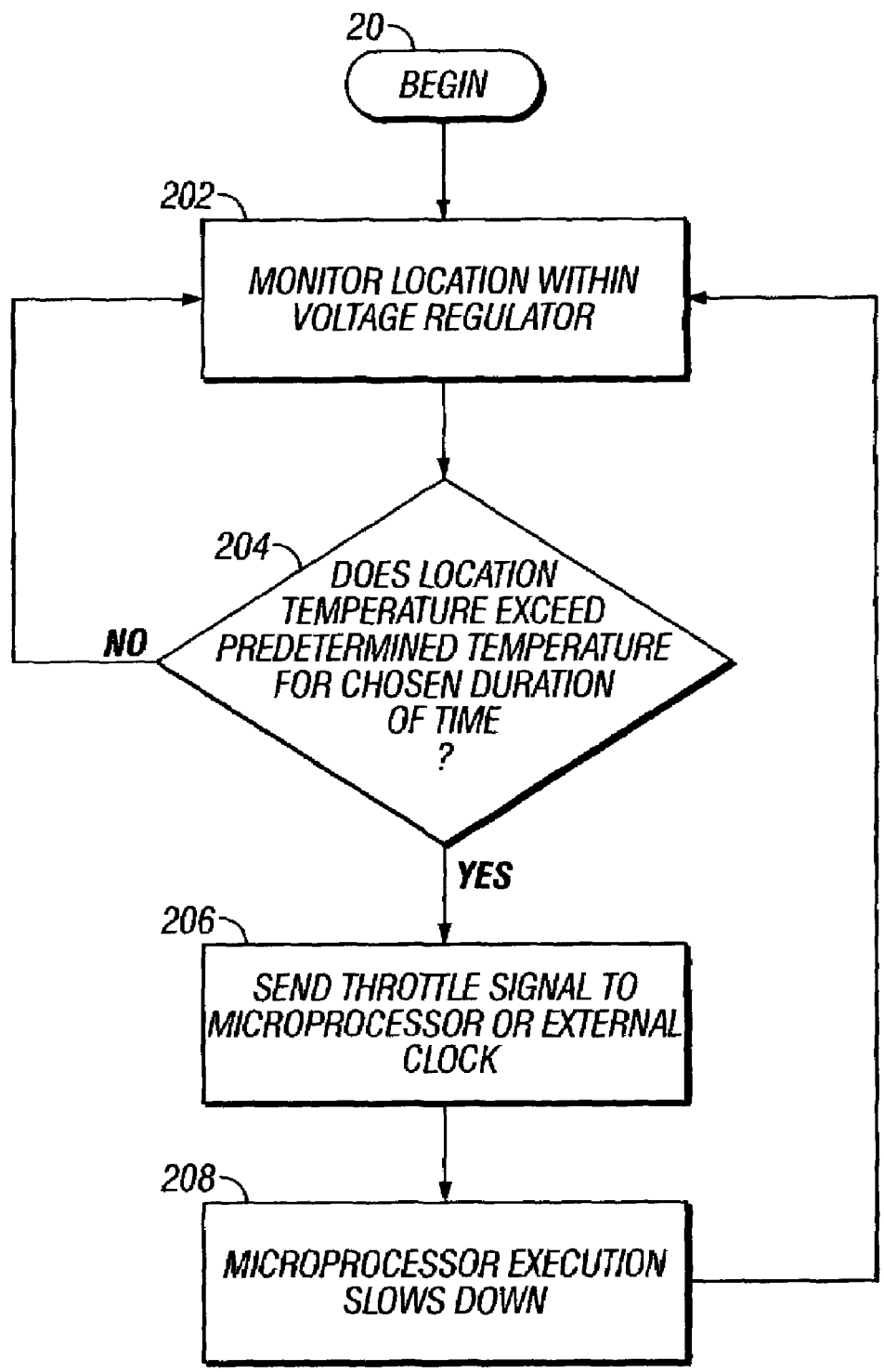
FIG. 5 is a flow diagram showing operation of the thermal monitoring circuit of FIGS. 1A and 1B according to some embodiments of the invention.

The flow diagram of FIG. 5 illustrates operation of the thermal monitor circuits 20 described above. Operations of the thermal monitor circuit 20 in systems with both power-reducing microprocessors (i.e., the system 100A of FIG. 1A) and microprocessors without internal power reduction capability (i.e., the system 100B of FIG. 1B) are considered.

The thermal monitor circuit 20 monitors the location 12 of the voltage regulator 10 (block 202). In one embodiment, the monitoring occurs continuously. In a second embodiment, the monitoring occurs periodically according to a programmable time interval.

When the temperature of the location 12 exceeds the predetermined temperature for a chosen time duration (block 204), the thermal monitor circuit 20 generates the throttle signal 56 (block 206). The throttle signal 56 is received by the microprocessor 30 at its PROCHOT#, or similar, pin (as in the system 100A of FIG. 1A), or by the external clock 38, where no microprocessor throttling is available (as in the system 100B of FIG. 1B). In the system 100A (or the system 100B), the execution of the microprocessor 30 (or the microprocessor 58) is slowed down (block 208).

Although the microprocessor 30 (or the microprocessor 58) is slowed down by the thermal monitor circuit 20, operation of the voltage regulator 10 is not affected. However, the demand for current coming into the microprocessor 30 (58) drops, in some cases, substantially. Since the current demand is diminished, the temperature of the voltage regulator 10 consequently drops. Also, despite the power reduction, the voltage regulator 10 maintains the ability to supply continuous current to the microprocessor 30 (58). Thus, temperature regulation of the voltage regulator is achieved without scaling back its current delivery capability.

The cost benefits of having a system in which the thermal condition of the voltage regulator is automatically controlled using the thermal monitor circuit 20 may be significant. A voltage regulator that operates at 90 Amps is designed with a 30% peak, for a total possible output current of 117 Amps, where no throttling occurs. At $0.25 per additional component, allocation for extra board space and extra cooling, the additional cost of the voltage regulator 10 with the thermal monitor circuit 20 is about $7.75, according to one embodiment. The cost to provide automatic throttling, such as using the thermal monitor circuits 20 of FIGS. 2, 3, or 4, is, in contrast, roughly $1.50, for a cost savings of $6.25.

Indirect Measurement of Voltage Regulator Thermal Condition

As an alternative to monitoring a location on the voltage regulator 10, the thermal monitoring circuit may detect a thermal condition by measuring the thermal current produced by the voltage regulator or by measuring the thermal current entering the voltage regulator. Such a thermal monitoring circuit 40 is depicted in the systems 200A and 200B of FIGS. 6A and 6B, respectively. The system 200A features the microprocessor 30 with an internal power reduction mechanism while the microprocessor 58 in system 200B has no internal power-reducing feature.

Figure 6A:
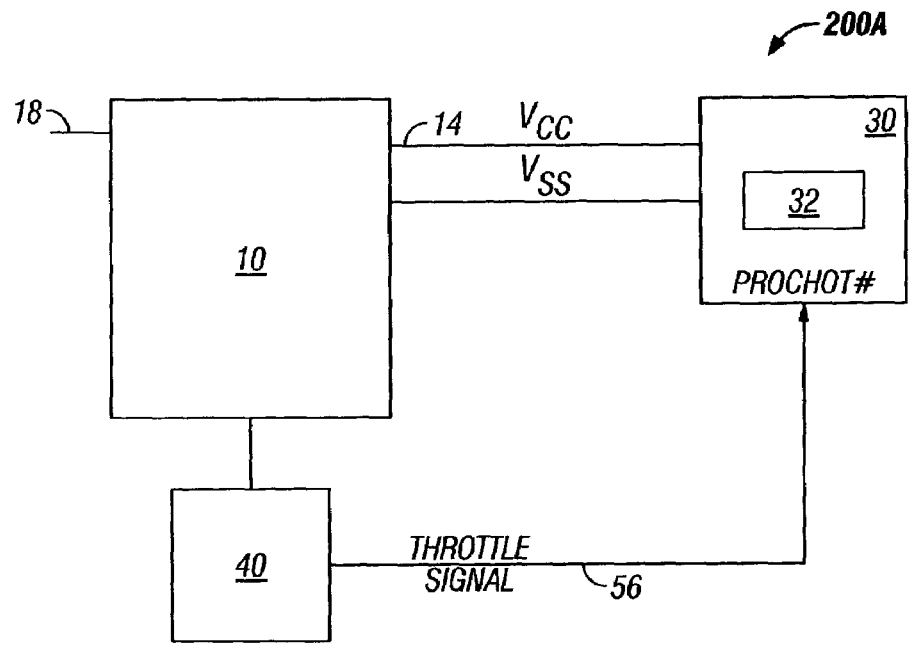
FIG. 6A is a block diagram of a second system including a microprocessor with power reduction capability according to some embodiments of the invention.
Figure 6B:
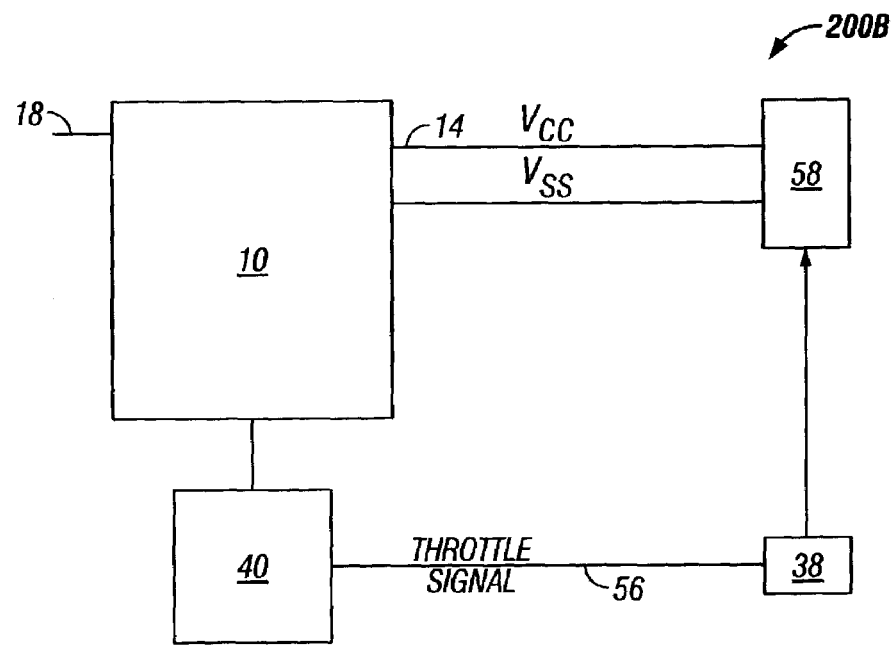
FIG. 6B is a block diagram of a second system including a microprocessor with no power reduction capability according to some embodiments of the invention.

Many voltage regulators include one or more pins that correspond to the input current or the output current (or both) of the voltage regulator. In FIGS. 6A and 6B, the voltage regulator 10 includes input current 18 and output current 14. By monitoring the output current 14, for example, the thermal monitoring circuit 40 can indirectly ascertain the temperature of the voltage regulator 10, so as to slow down the microprocessor 30 (FIG. 6A) or the microprocessor 58 (FIG. 6B), such that the current drawn is diminished. Similarly, the thermal condition of the voltage regulator 10 can be ascertained by monitoring the input current 18.

Figure 7:
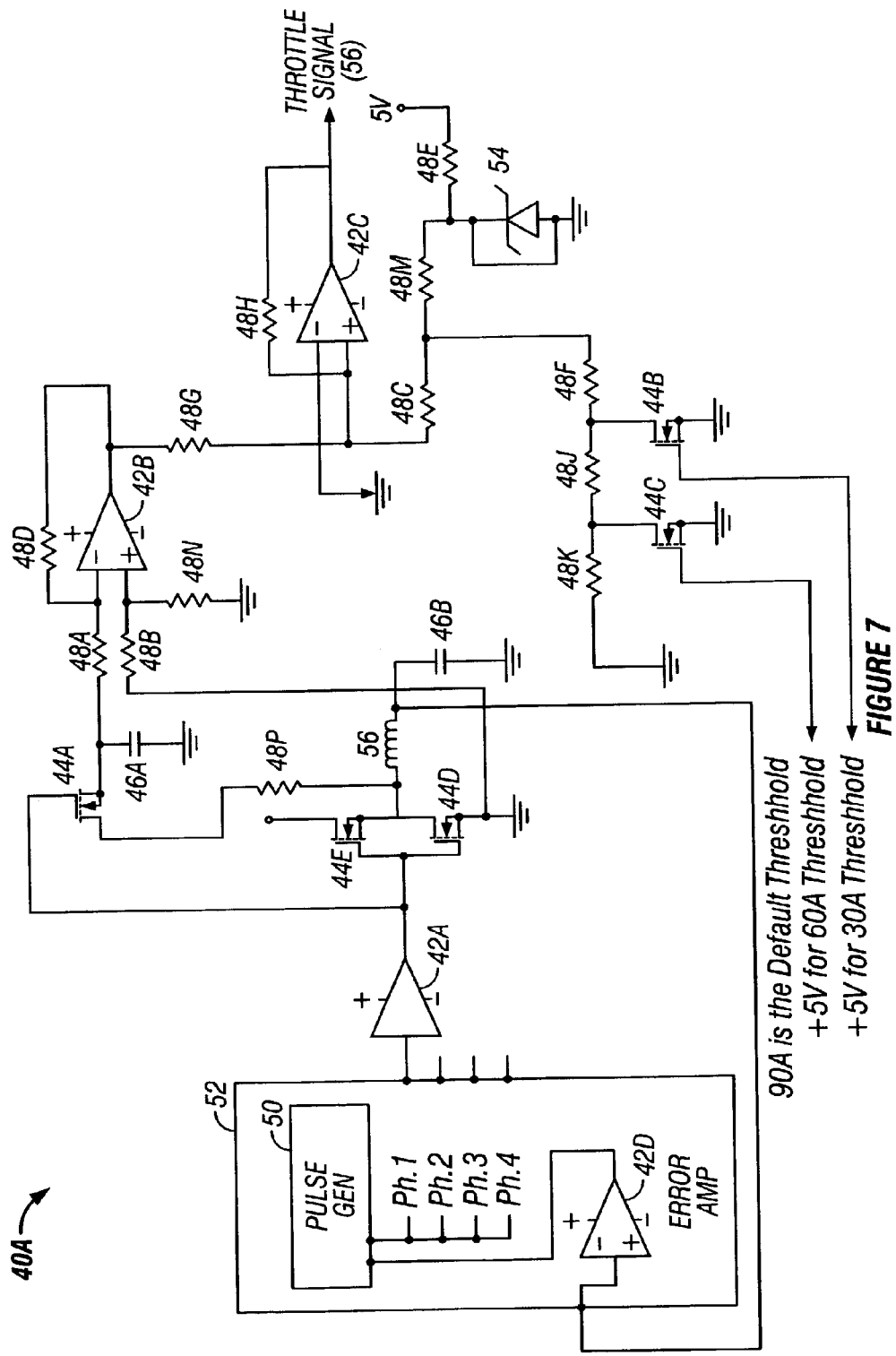
FIG. 7 is a block diagram of a thermal monitor circuit used by the systems of FIGS. 6A and 6B according to some embodiments of the invention.
Figure 8:
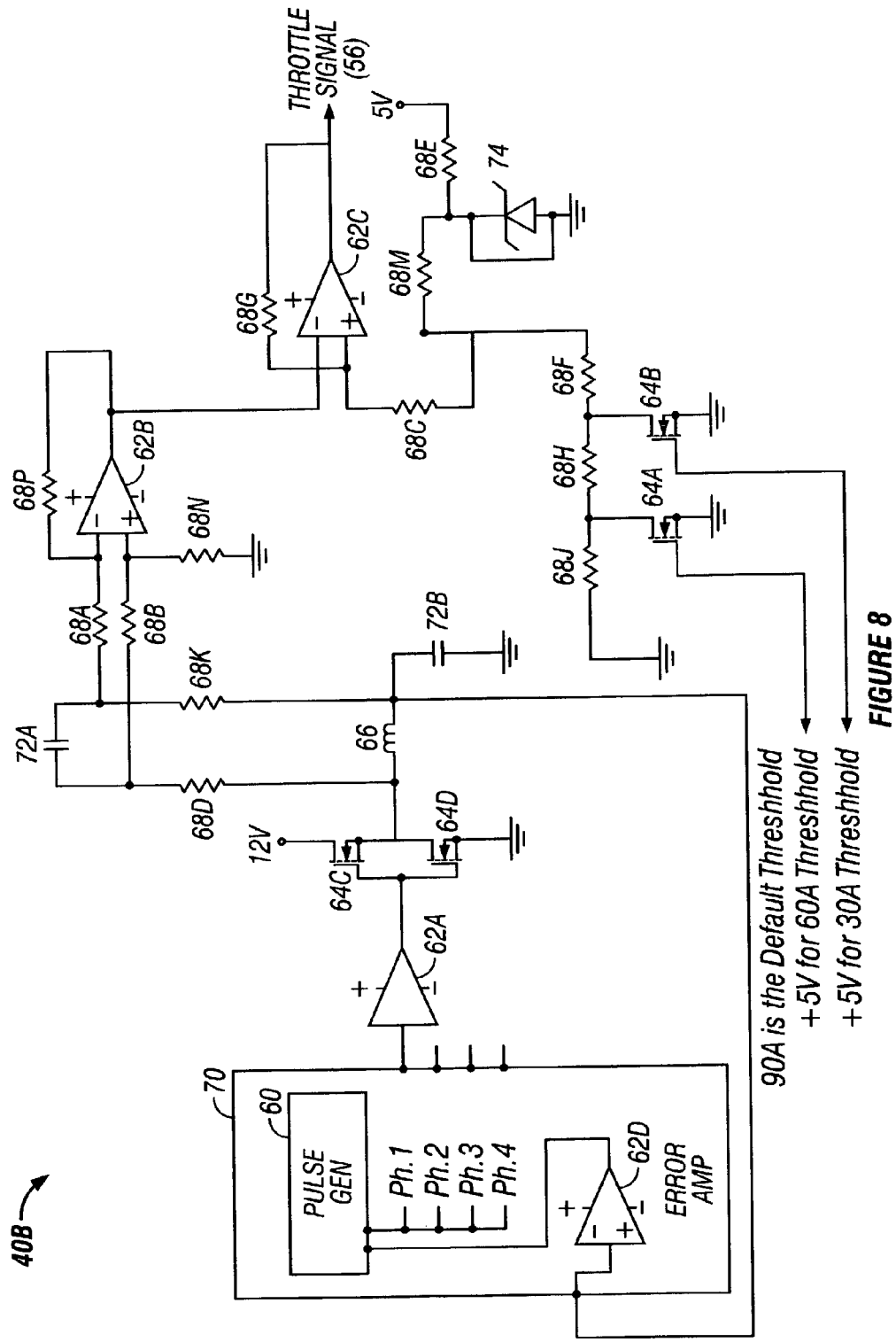
FIG. 8 is a block diagram of a second thermal monitor circuit used by the systems of FIGS. 6A and 6B according to some embodiments of the invention.

Thermal monitor circuits 40A and 40B (collectively, thermal monitor circuits 40) are featured in FIGS. 7 and 8, respectively. The thermal monitor circuits 40A and 40B employ distinct methods for determining the output current 14. The thermal monitor circuits 40 can similarly monitor the input current in identifying a thermal condition of the voltage regulator 10.

A thermal monitor circuit 40A or 40B, for use in the system 200A (FIG. 6A) or the system 200B (FIG. 6B), are illustrated in FIGS. 7 and 8. The thermal monitor circuit 40A detects an over-current condition in the voltage regulator 10. The thermal monitor circuit 40A includes a pulse width modulator (PWM) 52, including a pulse generator 50, op amps 42A–42D, field-effect transistors (FETs) 44A–44E, capacitors 46A and 46B, resistors 48A–48P, a shunt regulator 54, and an inductor 56. The thermal monitor circuit 40A operates in a single phase of the voltage regulator, as the other phases' outputs can be derived from the single phase. Alternatively, each phase can be monitored separately, although redundant monitoring circuitry is expected to increase the cost of the thermal monitor circuit.

The thermal monitor circuit 40A monitors the FET 44D to determine the output current The current going through the low side of the FET 44D produces a voltage equal to the output current per phase times the ON resistance of the FET 44D, known as $R_{DS-ON}$. When the low side FET 44D is turned on, the current flowing through it is negative; hence, the voltage sampled across the FET 44D will be negative going. The voltage is sampled and filtered by the FET 44A and buffered by the op amp 42B. The voltage is then fed through a resistor 48G to the plus (+) input of the op amp 42C. A 0.1 hysteresis is added via the resistor 48H. The resistor 48C adds this negative voltage to a voltage determined by a resistor divider. When the sampled voltage is less than the voltage determined by the resistor divider, the output of the op amp 42C will go low.

The resistor divider voltage is derived from the shunt regulator 54, in which current passes through the resistor 48M and then through resistors 48F, 48HJ, and 48K ground.

The FETs 44B and 44C may be switched on, depending on the desired output current threshold. In FIG. 7, the output current thresholds are 90 Amps, 60 Amps, and 30 Amps. If the gates of neither FET 44B nor 44C are high, a 90 Amps output current is expected before the throttle signal 56 is produced. If the gate of the FET 44C goes high (but the gate of FET 44B remains low), a 60-Amp output current is expected; if the gate of the FET 44B goes high, a 30-Amp output current is expected before the throttle signal 56 is produced.

In FIG. 8, a second thermal monitor circuit 40B, for use by the system 200A (FIG. 6A) or the system 200B (FIG. 6B), is illustrated. The thermal monitor circuit 40B includes a pulse width modulator (PWM) 70, including a pulse generator 60, op amps 62A–62D, field-effect transistors (FETs) 64A–64D, capacitors 72A and 72B, resistors 68A–68P, a shunt regulator 74, and an inductor 66. The circuitry of the thermal monitor circuit 40B operates in a single phase of the voltage regulator, as the other phases' outputs can be derived from the single phase.

The thermal monitor circuit 40B monitors the inductor 66 to determine the output current. Current going through the inductor 66 produces a voltage equal to the output current per phase multiplied by the direct current (DC) resistance of the inductor 66. This voltage is sampled and filtered by the op amp 62B. The voltage is then compared by the op amp 62C with a voltage determined by a resistor divider. A 0.1% hysteresis is added via resistor 68G. When the sampled voltage is greater than the voltage determined by the divider, the output of the op amp 62C goes low, generating the throttle signal 56.

The resistor divider voltage is derived from the shunt regulator 74, goes through the resistor 68M and then through resistors 68F, 68J, and 68K to ground.

Similar to the circuit 40A of FIG. 7, the circuit 40B includes gates for selecting which output current (90 Amps, 60 Amps, or 30 Amps) will generate the throttle signal 56. If the gates of FETs 64A and 64B are low, then the voltage appearing on the plus (+) input of the op amp 62C will expect 90 Amps of output current before the output of the op amp 62C will go low. If the gate of the FET 64D is high, then 60 Amps of output current is expected for the output of op amp 62C to go low. If the gate of FET 64B is high, then 30 Amps of output current is expected before the output of the op amp 62C goes low.

FIGS. 7 and 8 thus depict circuits 40 for inferring the temperature of the voltage regulator 10 by monitoring a component (inductor or FET) whose current is proportional to the output current 14. The principles of FIGS. 7 and 8 can also be used to infer the input current 18 of the voltage regulator. These voltage regulator parameters can be used to throttle the microprocessor (30 or 58) so as to reduce the current load on the voltage regulator 10 and, thus, control the thermal condition of the voltage regulator.

Figure 9:
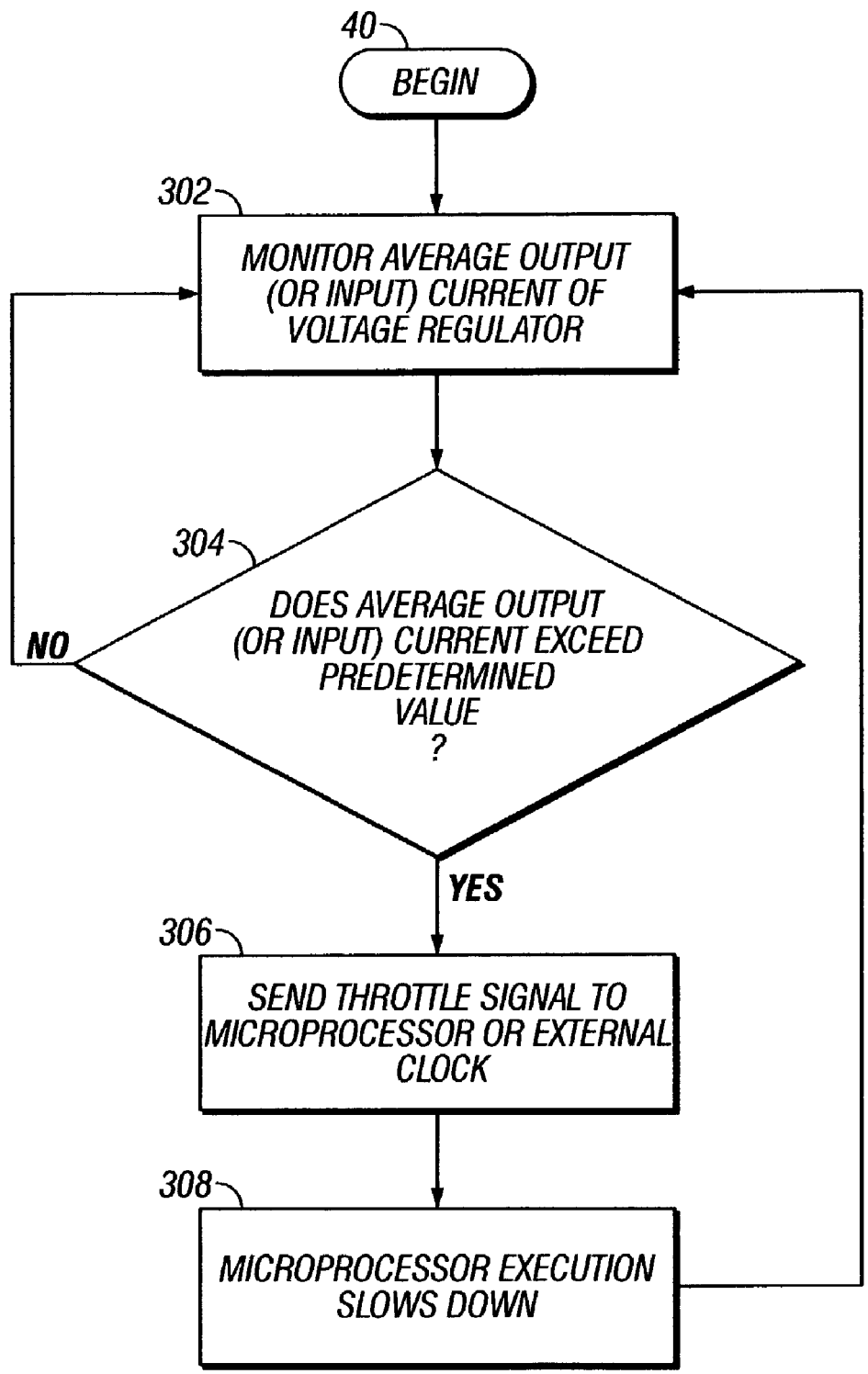
FIG. 9 is a flow diagram showing operation of the thermal monitoring circuit of FIGS. 6A and 6B according to some embodiments of the invention.

The flow diagram of FIG. 9 illustrates operation of the thermal monitor circuits 40 described above. The flow diagram considers operation of the thermal monitor circuit 40 in systems with both power-reducing microprocessors (i.e., the system 200A of FIG. 6A) and microprocessors without internal power reduction capability (i.e., the system 200B of FIG. 6B).

The thermal monitor circuit 40 monitors the average output current 14 (or input current 18) of the voltage regulator 10 (block 302). In one embodiment, the monitoring occurs continuously. In a second embodiment, the monitoring occurs periodically according to a programmable time interval.

When the average output current 14 (or input current 18) exceeds a predetermined value (block 304), the thermal monitor circuit 40 generates the throttle signal 56 (block 306). The throttle signal 56 is received by the microprocessor 30 at its PROCHOT#, or similar, pin (as in the system 200A of FIG. 6A), or by the external clock 38, where no microprocessor power reduction is available (as in the system 200B of FIG. 6B). In the system 200A (or the system 200B), the execution of the microprocessor 30 (or the microprocessor 58) is slowed down (block 308).

Although the microprocessor 30 (or the microprocessor 58) is slowed down by the thermal monitor circuit 40, operation of the voltage regulator 10 is not affected. However, the demand for current coming into the microprocessor 30 (58) drops, in some cases, substantially. Since the current demand is diminished, the temperature of the voltage regulator 10 consequently drops. Also, despite the power reduction, the voltage regulator 10 maintains the ability to supply continuous current to the microprocessor 30 (58). Thus, temperature regulation of the voltage regulator is achieved without scaling back its current delivery capability.

The cost benefits of having a system in which the thermal condition of the voltage regulator is automatically controlled using the thermal monitor circuit 40 may be substantial. A voltage regulator that operates at 90 Amps is designed with a 30% peak, for a total possible output current of 117 Amps, where no throttling occurs. At $0.25 per additional component, allocation for extra board space, extra cooling, and an AC-to-DC power supply, the additional cost of the voltage regulator 10 without the thermal monitor circuit 40 is about $6.85, according to one embodiment. The cost to provide automatic throttling, such as using the thermal monitor circuits 40 of FIGS. 7 or 8, is, in contrast, roughly $1.50, for a cost savings of $5.35.

While the invention has been described with respect to a limited number of embodiments, those skilled in the art will appreciate numerous modifications and variations therefrom. It is intended that the appended claims cover all such modifications and variations as fall within the true spirit and scope of the invention.

We claim:

1. A system comprising:
   a voltage regulator for supplying a voltage to a microprocessor, the voltage regulator comprising a location; and
   a circuit coupled to the location, the circuit comprising:
      a thermistor and a first resistor coupled to the location, the thermistor and the first resistor establishing a voltage;
      a pair of resistors coupled between a source voltage and a ground, the pair of resistors supplying a reference voltage; and
      a comparator for receiving the voltage and the reference voltage; wherein the circuit:
   issues a throttle signal to a clock, the clock controlling the rate at which instructions are executed by the microprocessor, wherein the throttle signal is issued from the comparator when the voltage exceeds the reference voltage.

2. The system of claim 1, wherein the clock is internal to the microprocessor and the throttle signal activates a prochot# or similar pin of the microprocessor.

3. The system of claim 1, wherein the clock is external to the microprocessor and the throttle signal slows down the external clock.

4. The system of claim 1, the voltage regulator further comprising an input current, wherein the location is coupled to the input current.

5. The system of claim 1, the voltage regulator further comprising an output current, wherein the location is coupled to the output current.

6. A system comprising:
   a voltage regulator for supplying a voltage to a microprocessor, the voltage regulator comprising a location; and
   a circuit coupled to the location, the circuit comprising an op amp comprising a first input and a second Input, the first input being coupled to a first resistor and a second resistor, the first resistor being coupled to a voltage source and the second resistor being coupled to ground, the pair of resistors providing a reference voltage to the op amp, the second input being coupled to a thermistor, wherein the op amp produces a throttle signal when a resistance of the thermistor drops below the resistance of the second resistor;

wherein the throttle signal is issued to a clock, the clock controlling the rate at which instructions are executed by the microprocessor.

7. The system of claim 6, wherein the thermistor tracks current flowing through a field-effect transistor within the circuit.

8. The system of claim 6, wherein the thermistor tracks current flowing through an inductor within the circuit.

9. The system of claim 7, wherein the clock is internal to the microprocessor and the throttle signal is coupled to a prochot# or similar pin of the microprocessor.

10. The system of claim 7, wherein the clock is external to the microprocessor.

11. The system of claim 8, wherein the clock is internal to the microprocessor and the throttle signal is coupled to a prochot# or similar pin of the microprocessor.

12. The system of claim 8, wherein the clock is external to the microprocessor.

13. The system of claim 6, the voltage regulator further comprising an input current, wherein the location is coupled to the input current.

14. The system of claim 6, the voltage regulator further comprising an output current, wherein the location is coupled to the output current.

15. The system of claim 13, wherein the circuit further comprises a transistor in which current passing through the transistor produces a voltage that is proportional to the average output current, wherein the circuit sends a signal to the microprocessor when the voltage across the transistor exceeds a predetermined voltage.

16. The system of claim 12, wherein the circuit activates the power-reducing feature of the microprocessor coupled to the voltage regulator by throttling a clock external to the microprocessor.

17. The system of claim 16, wherein the circuit further comprises an inductor whose voltage is proportional to the average output current, wherein the circuit sends a signal to the clock when the voltage across the inductor exceeds a predetermined voltage.

18. The system of claim 16, wherein the circuit further comprises a transistor in which current passing through the transistor produces a voltage that is proportional to the average output current, wherein the circuit sends a signal to the dock when the voltage across the transistor exceeds a predetermined voltage.

* * * * *